(12) United States Patent
Daugirdas

(10) Patent No.: US 10,004,186 B2
(45) Date of Patent: Jun. 26, 2018

(54) HYDROPONIC PLANTING TOWER WITH HORIZONTAL GROW PLATFORM

(71) Applicant: Jonas M Daugirdas, Palm Beach Gardens, FL (US)

(72) Inventor: Jonas M Daugirdas, Palm Beach Gardens, FL (US)

( * ) Notice: Subject to any disclaimer, the term of this patent is extended or adjusted under 35 U.S.C. 154(b) by 320 days.

(21) Appl. No.: 14/878,503

(22) Filed: Oct. 8, 2015

(65) Prior Publication Data

US 2016/0100535 A1    Apr. 14, 2016

Related U.S. Application Data

(60) Provisional application No. 62/061,480, filed on Oct. 8, 2014.

(51) Int. Cl.
| | |
|---|---|
| *A01G 31/00* | (2018.01) |
| *A01G 31/06* | (2006.01) |
| *A01G 24/00* | (2018.01) |

(52) U.S. Cl.
CPC ........... *A01G 31/001* (2013.01); *A01G 24/00* (2018.02); *A01G 31/06* (2013.01); *Y02P 60/216* (2015.11)

(58) Field of Classification Search
CPC ........... A01G 31/001; A01G 2031/006; A01G 27/003; A01G 31/06; A01G 24/00; Y02P 60/216
USPC ................................................. 47/62 R, 62 E
See application file for complete search history.

(56) References Cited

U.S. PATENT DOCUMENTS

| 5,363,594 | A | * | 11/1994 | Davis | A01G 9/022 47/82 |
|---|---|---|---|---|---|
| 5,440,836 | A | * | 8/1995 | Lee | A01G 31/06 47/59 R |
| 5,555,676 | A | * | 9/1996 | Lund | A01G 9/022 47/82 |
| 6,408,570 | B1 | * | 6/2002 | Shih | A01G 31/02 47/79 |
| 7,055,282 | B2 | | 6/2006 | Bryan, III | |
| 7,516,574 | B2 | * | 4/2009 | Gottlieb | A01G 9/023 47/62 R |
| 2009/0265986 | A1 | * | 10/2009 | Young | A01G 31/02 47/62 R |
| 2011/0061297 | A1 | * | 3/2011 | Simmons | A01G 31/02 47/62 A |
| 2015/0096228 | A1 | * | 4/2015 | Watson | A01G 27/008 47/79 |

(Continued)

*Primary Examiner* — Joshua D Huson
(74) *Attorney, Agent, or Firm* — McHale & Slavin, P.A.

(57) ABSTRACT

The present invention is directed towards an improvement to hydroponic systems using vertical platforms to cultivate plants. A horizontal platform, and system using the horizontal platform, designed to provide for plant growth in a soilless growth medium using an ebb and flow system to cultivate plants within the horizontal platform is provided. The horizontal platform uses a floating valve system to control the amount of fluid cycled through the horizontal grow platform. The present invention further provides for a device that converts a hydroponic vertical tower to a hydroponic device using a vertical tower platform which is designed to circulate nutrients for plant growth in a soilless growth medium and a horizontal platform designed to provide for plant growth in a soilless growth medium using an ebb and flow system to cultivate plants within the horizontal platform.

17 Claims, 21 Drawing Sheets

(56) References Cited

U.S. PATENT DOCUMENTS

2015/0296726 A1* 10/2015 Higgins ................ A01K 63/00
 47/62 R
2015/0319947 A1* 11/2015 Smith .................... A01G 31/02
 47/62 A \* cited by examiner

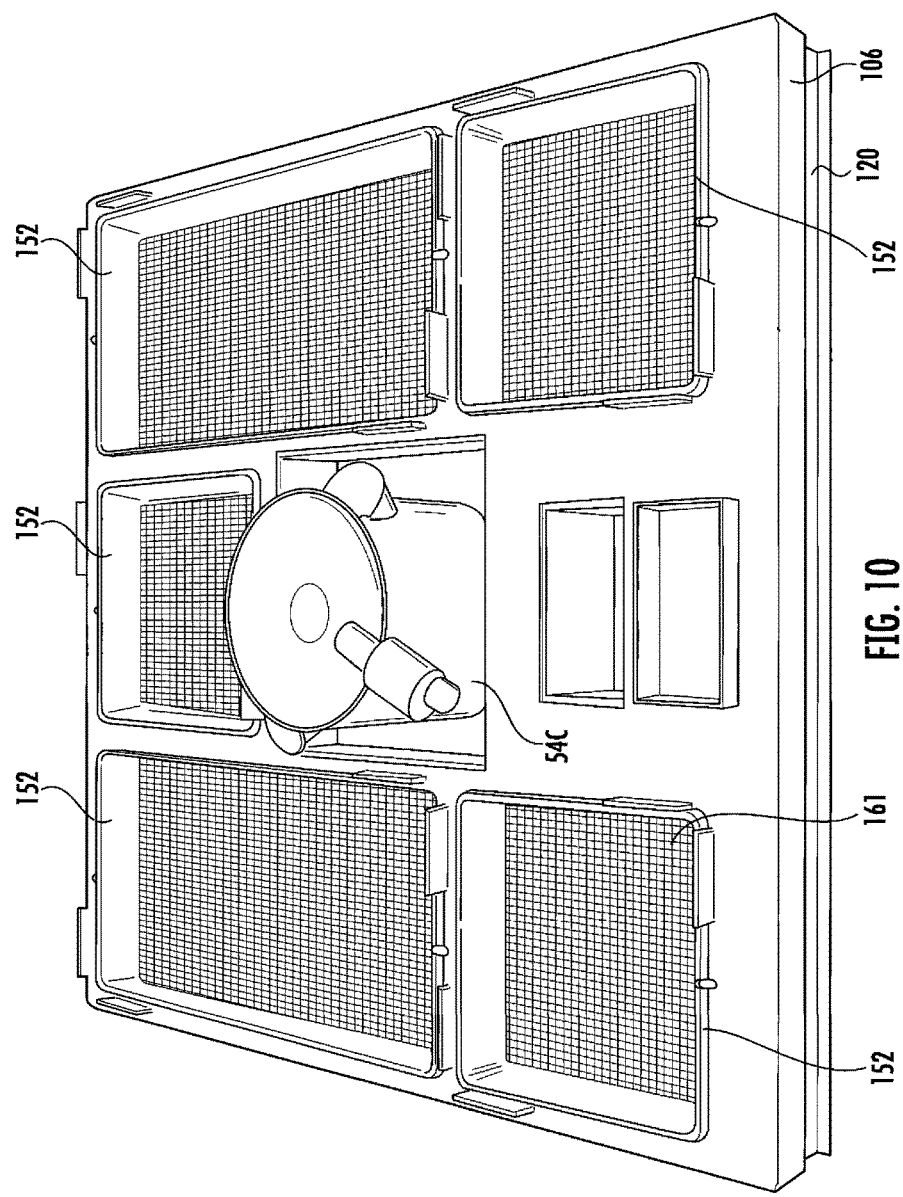

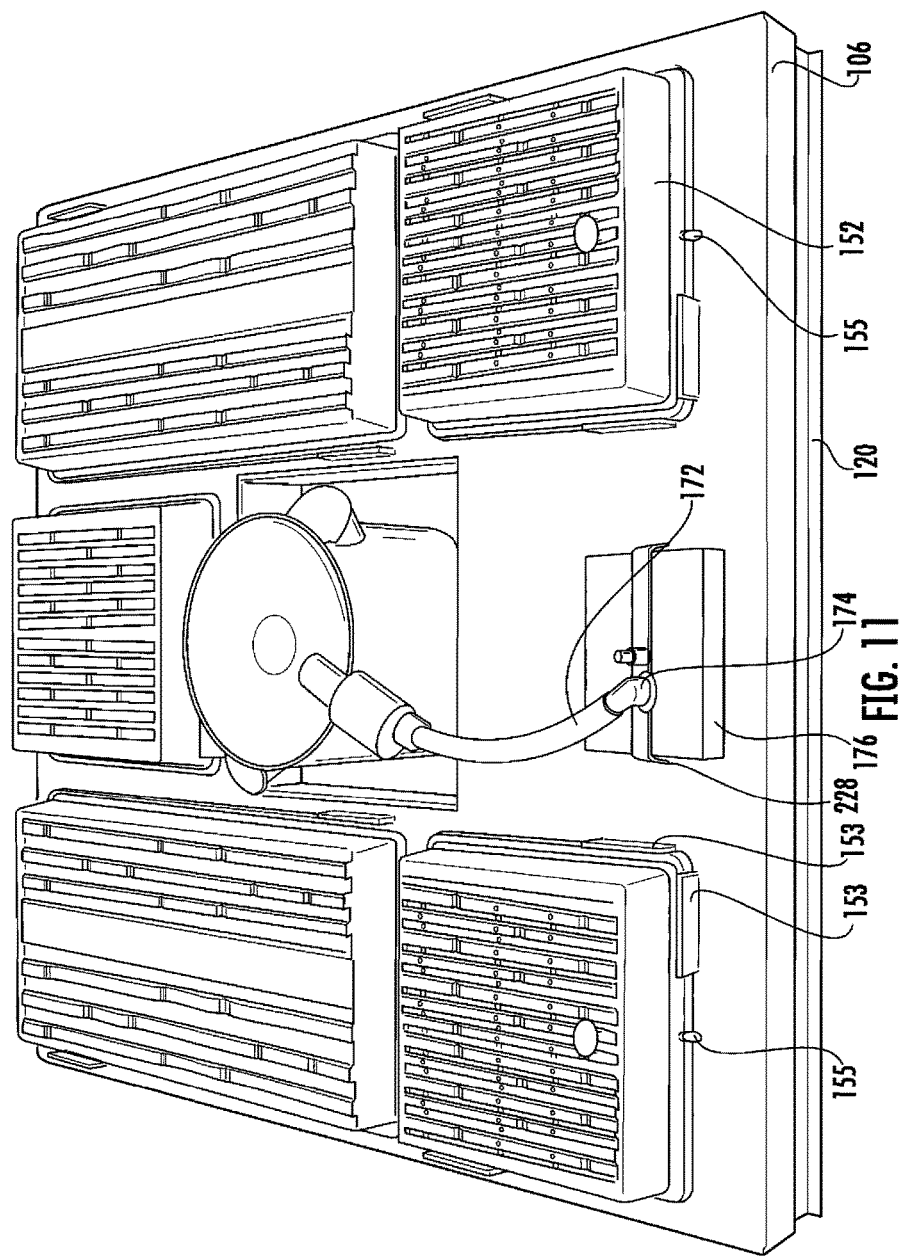

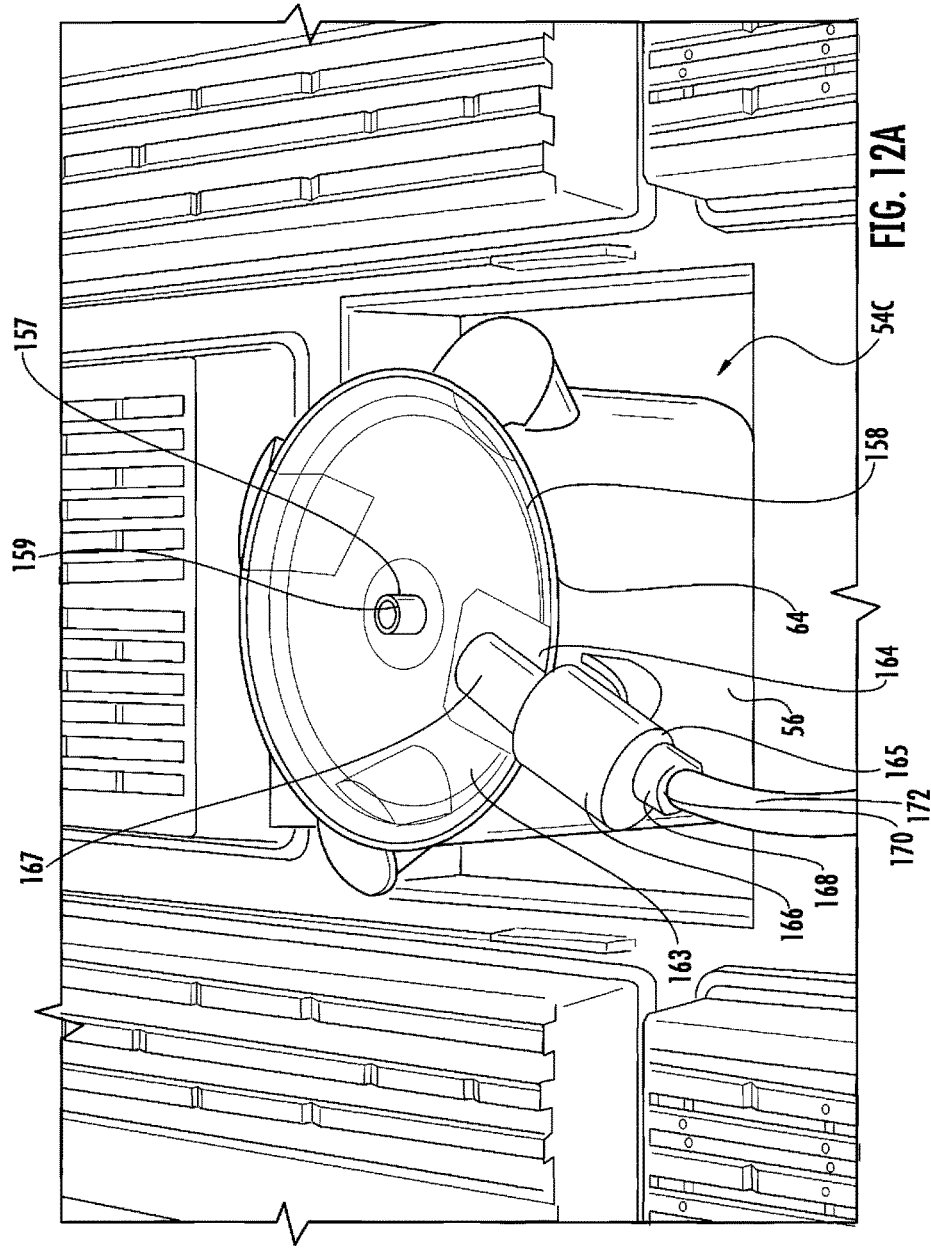

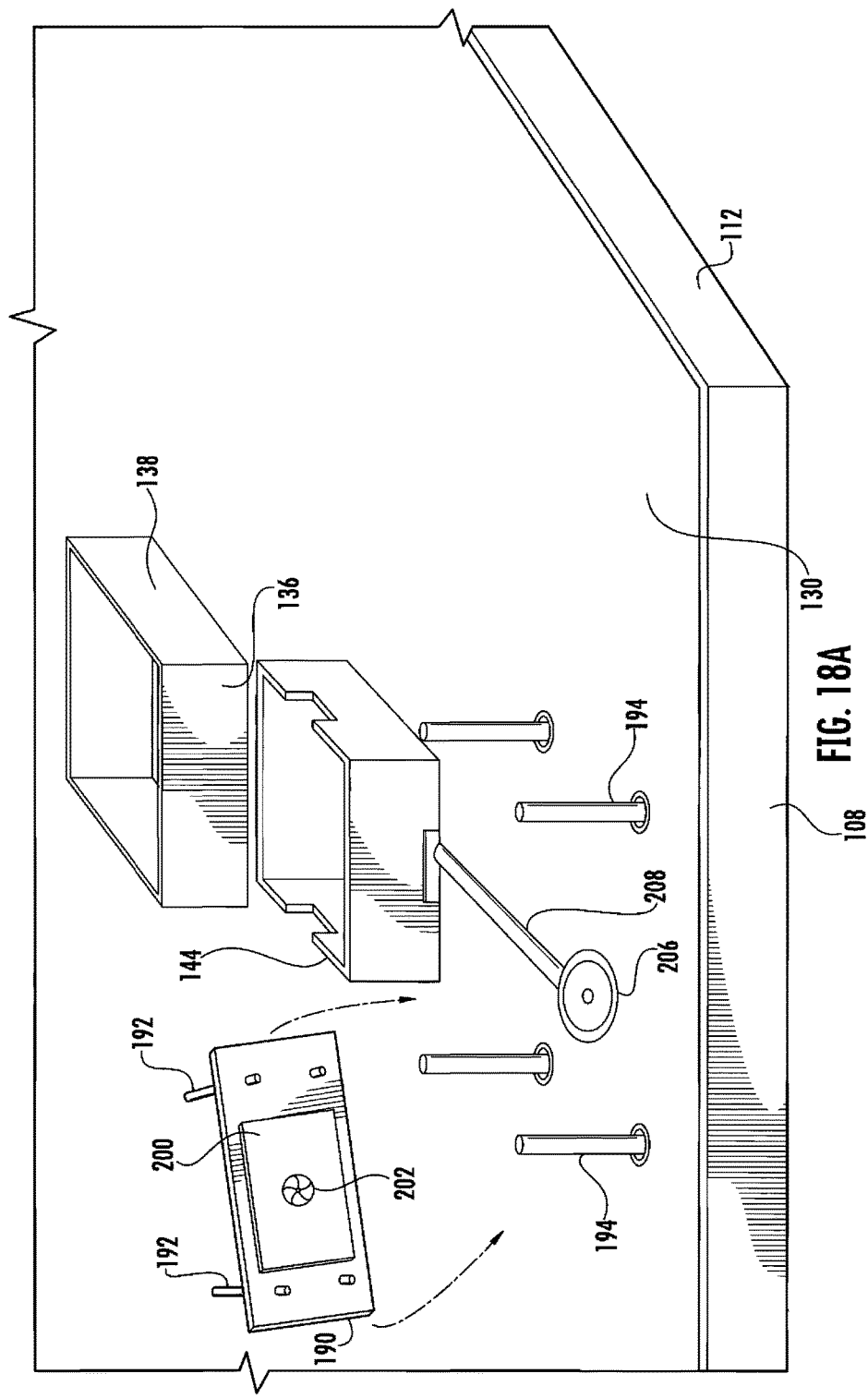

US 10,004,186 B2

HYDROPONIC PLANTING TOWER WITH HORIZONTAL GROW PLATFORM

CROSS-REFERENCE

In accordance with 37 C.F.R. 1.76, a claim of priority is included in an Application Data Sheet filed concurrently herewith. Accordingly, the present invention claims priority under 35 U.S.C. § 119(e) to U.S. Provisional Application 62/061,480 entitled "HYDROPONIC PLANTING TOWER WITH HORIZONTAL GROW PLATFORM", filed on Oct. 8, 2014. The contents of the above referenced application are herein incorporated by reference in its entirety.

FIELD OF THE INVENTION

The present invention relates to a device for cultivating plants, to a device for cultivating plants in a soilless environment, and more particularly, to a device using a vertical tower and a horizontal platform to cultivate plants. The present invention provides a horizontal platform designed to provide for plant growth in a soilless growth medium using an ebb and flow system to cultivate plants within the horizontal platform. The horizontal platform can be used independently or in combination with a vertical tower platform designed to circulate nutrients for plant growth in a soilless growth medium. The present invention therefore provides for a device that converts a hydroponic vertical tower to a hydroponic device using a vertical tower platform which is designed to circulate nutrients for plant growth in a soilless growth medium and a horizontal platform designed to provide for plant growth in a soilless growth medium using an ebb and flow system to cultivate plants within the horizontal platform.

SUMMARY OF THE INVENTION

The present invention is directed towards an improvement to hydroponic systems using vertical platforms to cultivate plants. The present invention provides a horizontal platform, and system using the horizontal platform, designed to provide for plant growth in a soilless growth medium using an ebb and flow system to cultivate plants within the horizontal platform. A unique valve floating valve system is configured to control the amount of a fluid cycling in and out of at least a portion of the horizontal platform. The system using the horizontal platform may further include a vertical tower platform which is designed to circulate nutrients for plant growth in a soilless growth medium using a drip system. The present invention further provides for a device that converts a hydroponic vertical tower to a hydroponic device using a vertical tower platform which is designed to circulate nutrients for plant growth in a soilless growth medium and a horizontal platform designed to provide for plant growth in a soilless growth medium using an ebb and flow system to cultivate plants within the horizontal platform.

In one embodiment, a horizontal platform for growing plants in a soilless environment comprising a top portion; a bottom portion configured to receive and store a fluid; and a floating valve system configured to control the amount of said fluid entering or exiting said horizontal grow platform bottom portion is provided. The floating valve system comprises a buoyant structure having a fluid holding structure sized and shaped to receive and hold a predetermined volume of a fluid positioned on a first surface. The floating valve system further comprises a shaped float member having a release orifice arranged on a second opposing surface. The fluid holding structure has an opening positioned within a bottom wall of the fluid holding structure and is sized and shaped to allow fluid to travel between a first surface and a second opposing surface. A shaped float member seat sized and shaped to receive said shaped float member forms part of the floating valve system.

In an alternative embodiment, a system for growing plants in a soilless growth medium using a horizontal grow platform comprising a top portion and a bottom portion configured to receive and store a fluid; a valve system configured to control the amount of fluid entering or exiting said horizontal grow platform bottom portion; a fluid reservoir operatively coupled to said horizontal grow platform; and a pump configured to move said fluid from said fluid reservoir to said horizontal grow platform. The valve system includes a buoyant structure having a fluid holding basin sized and shaped to receive and hold a predetermined volume of a fluid on one surface and a shaped float member having a calibrated release orifice arranged on a second opposing surface, said fluid holding basin having an opening positioned within a bottom wall sized and shaped to allow fluid to move between said one surface and said second opposing surface; and a shaped float member seat sized and shaped to receive said shaped float member. Optionally, the system may include one or more vertically arranged components sized and shaped to receive plants or plant seeds.

Accordingly, it is an objective of the instant invention to provide a device for cultivating plants in a soilless environment.

It is a further objective of the present invention to provide a device for cultivating plants in a soilless environment using both a vertical tower platform and a horizontal platform to cultivate or grow one or more plants.

It is yet another objective of the present invention to provide a device that converts a hydroponic vertical tower to a hydroponic apparatus having a vertical tower platform designed to circulate nutrients for plant growth in a soilless growth medium and a horizontal platform designed to provide for plant growth in a soilless growth medium using an ebb and flow system to cultivate plants within the horizontal platform.

It is a further objective of the present invention to provide a system for growing plants in a soilless growth medium using a horizontal grow platform having a horizontal grow platform utilizing a float valve system.

It is a further objective of the present invention to provide a horizontal platform for growing plants in a soilless environment having a float valve system configured to control the amount of the fluid entering or exiting the horizontal grow platform bottom portion.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 10 illustrates the growth platform in FIG. 9 with mesh materials placed within the grow containers;

FIG. 11 illustrates the horizontal growth platform with grow containers arranged in an upside down orientation and covering a first grow container;

FIG. 12A illustrates an embodiment of a modified module;

FIG. 18A illustrates a portion of the horizontal grow platform floating valve system with the liquid holding basin removed.

DETAILED DESCRIPTION OF THE INVENTION

Figure 1:
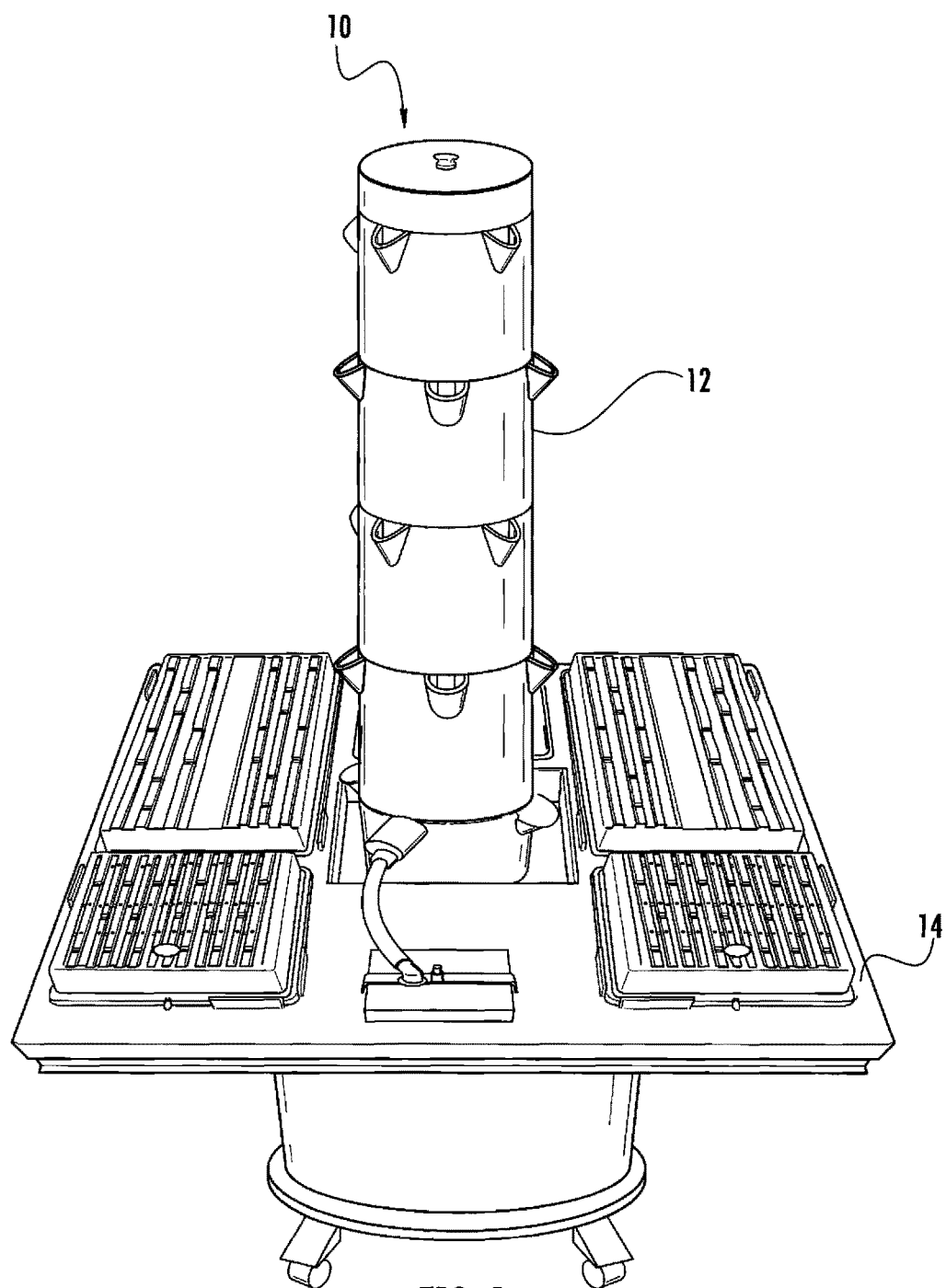
FIG. 1 is a perspective view of an illustrative embodiment of a hydroponic planting tower with a horizontal growing platform shown with covers covering wheatgrass.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
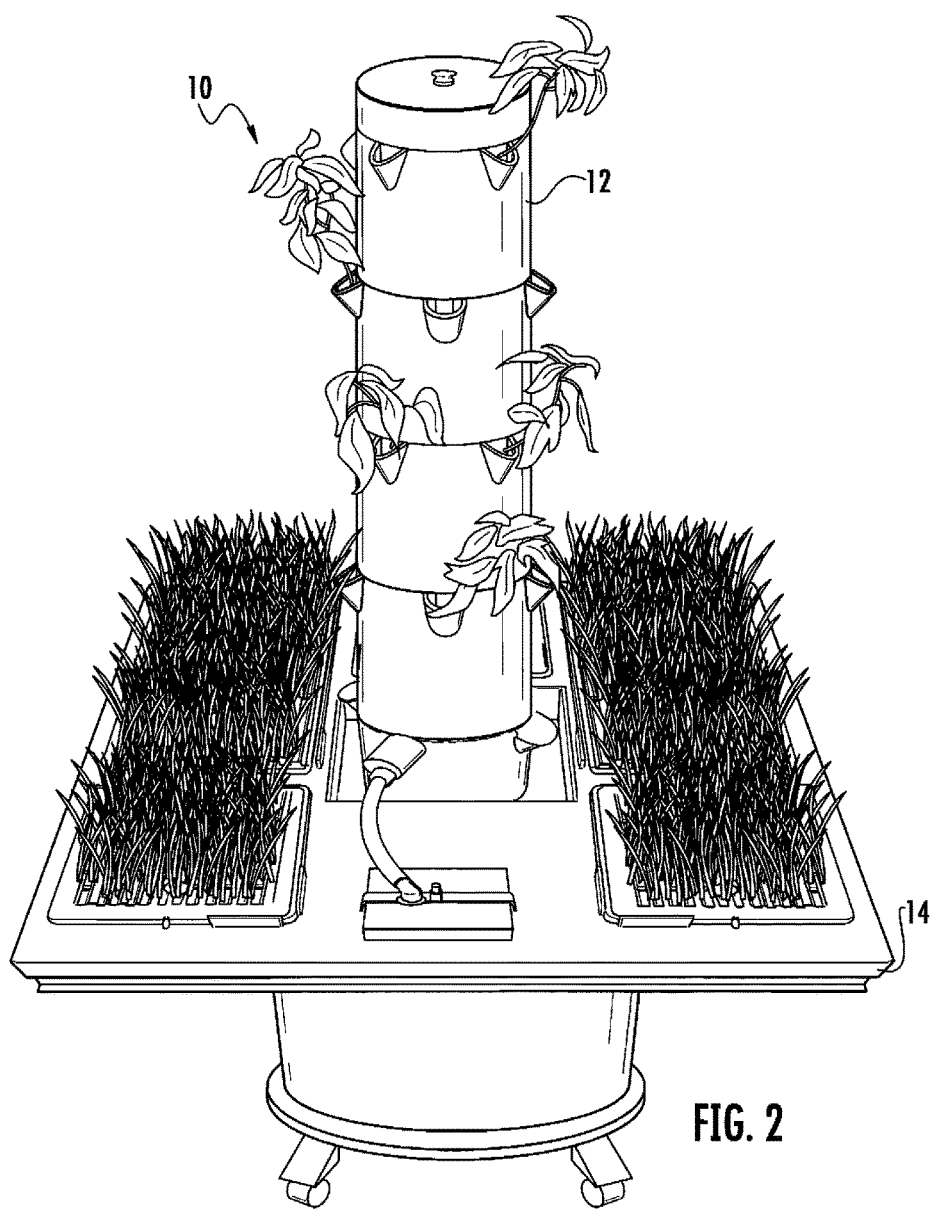
FIG. 2 is a perspective view of the hydroponic planting tower with a horizontal growing platform illustrated in FIG. 1 shown with the covers removed to allow wheatgrass to sprout and grow.
Figure 3:
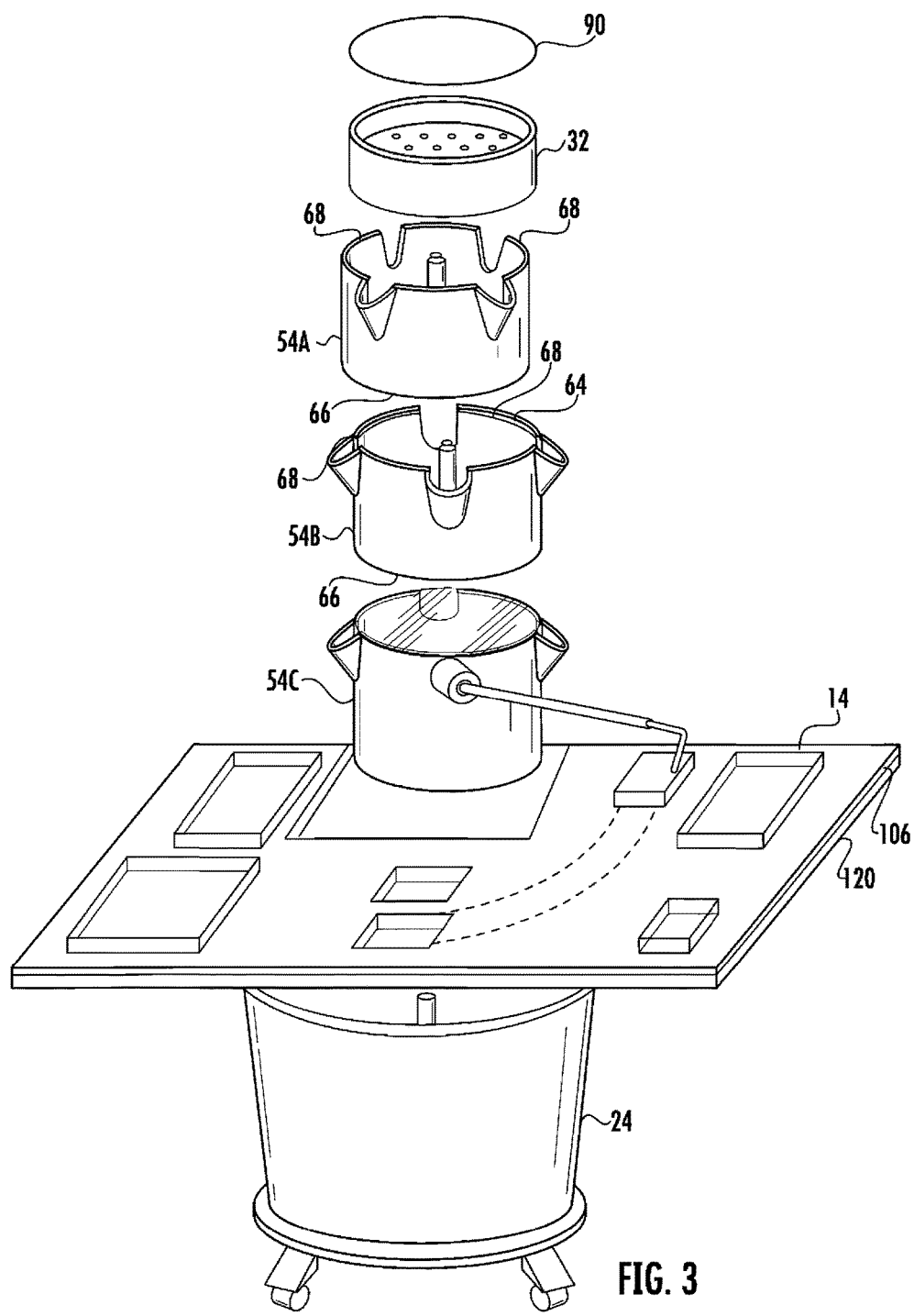
FIG. 3 is an exploded view of the hydroponic planting tower with a horizontal growing platform.

Referring to FIGS. 1-3, an illustrative embodiment of a hydroponic planting tower with a horizontal growing platform, referred to generally as 10, is shown. The hydroponic planting tower with a horizontal growing platform 10 is shown having a vertical tower growing platform 12 and a horizontal growing platform 14. The vertical tower growing platform 12 is configured to circulate nutrients for plant growth in a soilless growth medium. The horizontal platform 14 is designed to provide for plant growth in a soilless growth medium using an ebb and flow system to cultivate plants growing within containers stored in the horizontal platform.

Figure 4:
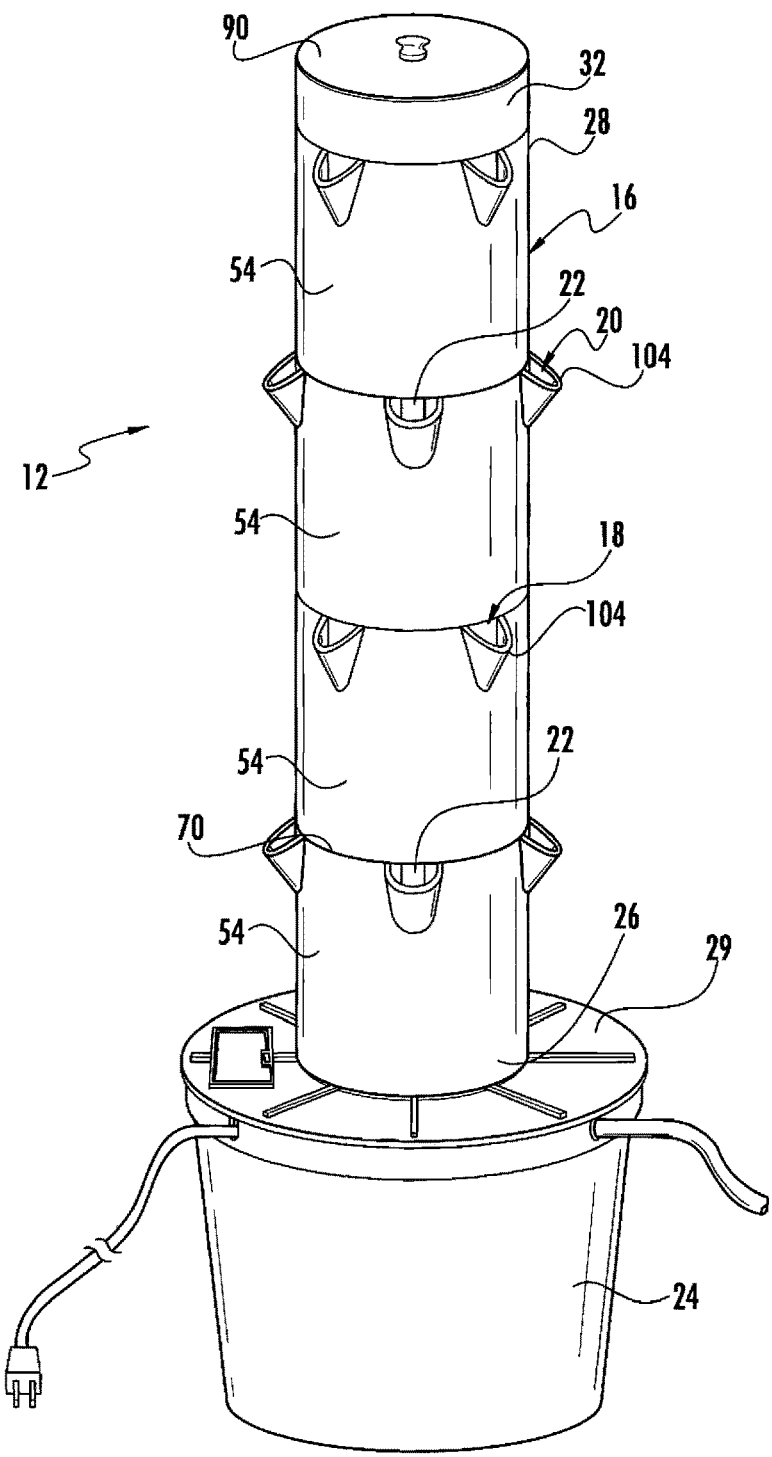
FIG. 4 is a perspective view of a prior art example of a hydroponic planting tower.

FIG. 4 illustrates an embodiment of the vertical tower growing platform 12 portion of the hydroponic planting tower with a horizontal growing platform 10. The embodiment of the vertical tower growing platform 12 illustrated in FIG. 4 represents a pre-existing tower which is described in U.S. Pat. No. 7,055,282. The vertical tower growing platform 12 comprises a planting column 16 having a hollow interior for receiving, holding and storing a planting medium. Positioned along the perimeter of the planting column 16 are planting ports 18. The planting ports 18 are sized and shaped to receive and hold a plant. The plant is inserted within the interior 20 of the planting ports 18, whereby the roots of a plant are inserted within a planting medium. A conduit 22 may be integrally formed within and axially extend through a hollow interior of the planting column 16 and a planting medium. The conduit 22 is preferably centrally positioned within the planting column 16. However, the positioning of the conduit 22 can be off-center or to the side. The conduit 22 is configured to transport fluid, such as plant nutrients or water, from a reservoir 24, illustrated herein as a container, to the bottom portion 26 of the planting column 16, and up to the top portion 28 of the planting column 16. Resting on top of the reservoir 24 is a mounting member 29. The mounting member 29, if needed, engages the bottom portion 26 of the planting column 16 to mount the planting column 16 in a vertical orientation.

The planting column 16 is fluidly connected to the reservoir 24 in order to circulate the fluid within the interior of the column and within the horizontal platform 12. A supply line 30, see FIGS. 5A and 6, connects the reservoir 24 to conduit 22, thereby providing a mechanism to direct the fluid into the planting column 16. At the top of the planting column is a fluid distributor 32. The fluid distributor 32 is fluidly connected to conduit 14 and distributes fluid into the interior of the planting column 16. Such arrangement allows for the circulation of the fluid, i.e. plant nutrient or water, through the planting column 16, into the horizontal platform 14 (FIG. 3) to provide nutrients or water to plants housed within planting ports 18 and/or stored within the horizontal platform 14.

Figure 5A:
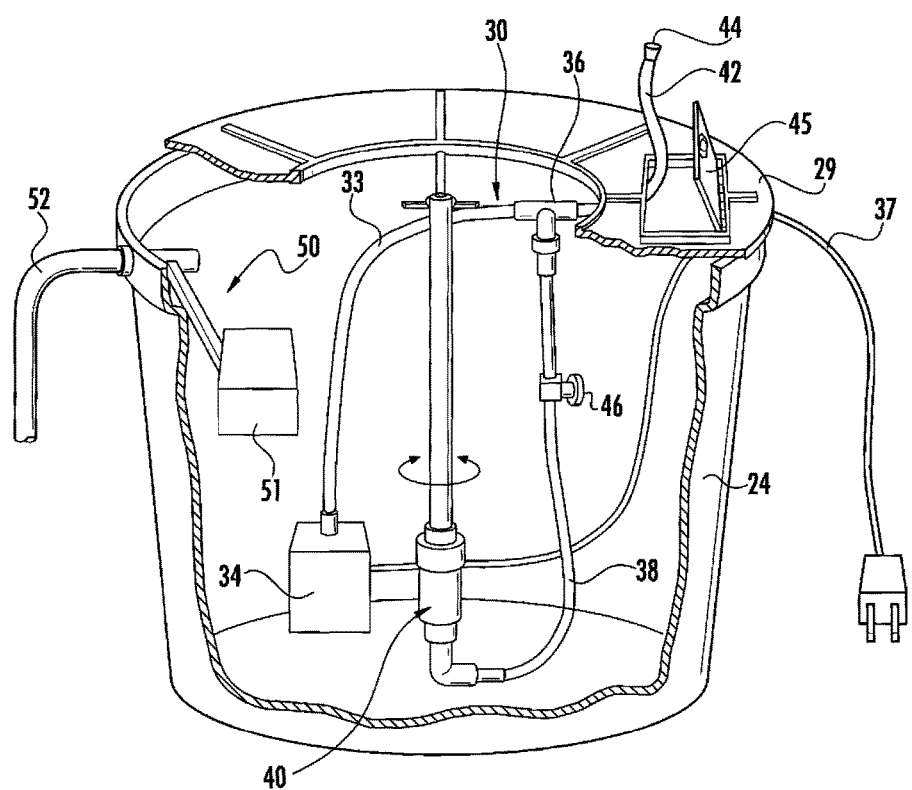
FIG. 5A is a cut away view of an illustrative prior art embodiment of a reservoir which can be used in the present invention.
Figure 6:
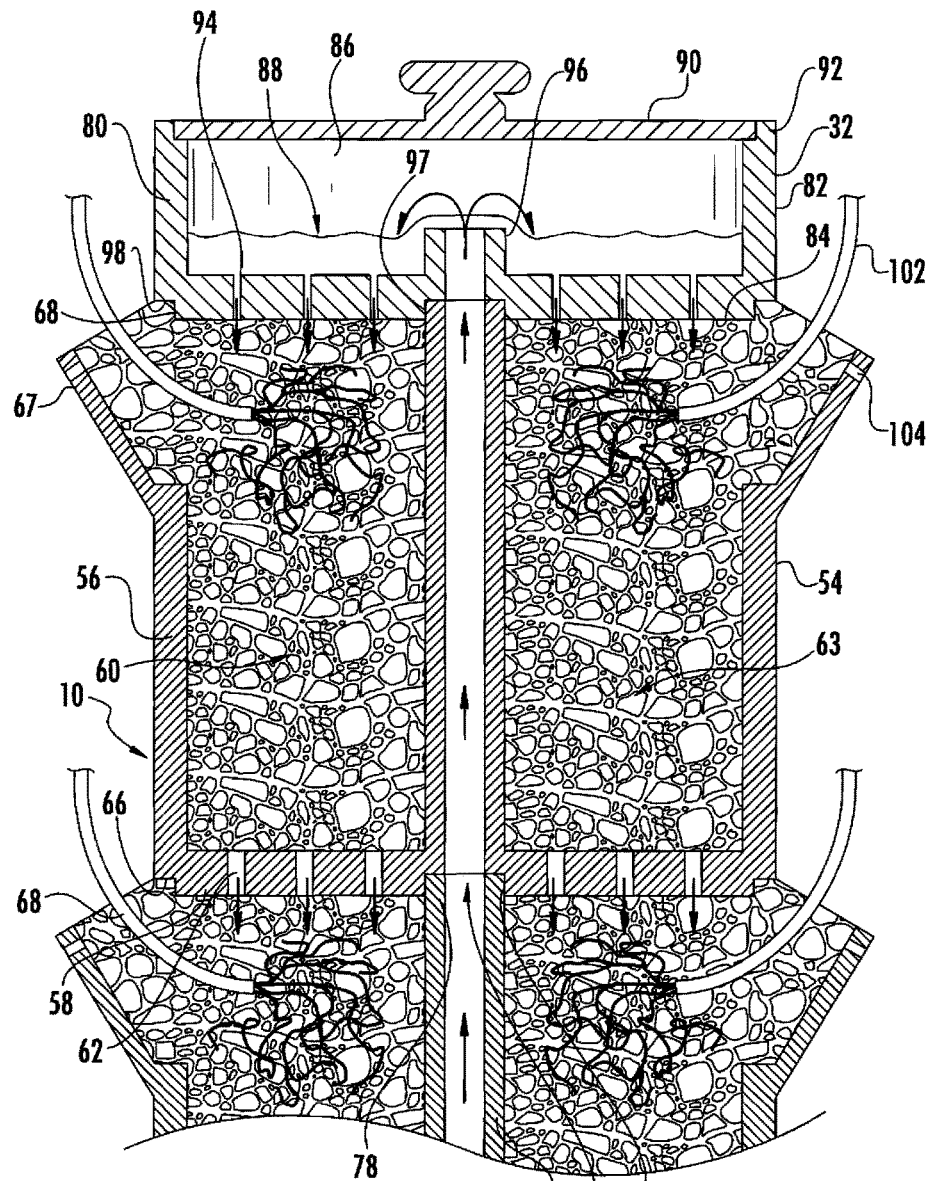
FIG. 6 is a cross sectional view of a prior art bottom portion of a planting column mounted on top of the reservoir.

A first supply line 33 extends from a pump (preferably submersible pump) 34 to a splitter 36, see FIG. 5A. The pump 34 is controlled by power supply 37. A second supply line 38 extends from the splitter 36 to direct fluid to conduit 22. A swivel connector 40 may be used in the connection with the second supply line 38. A drain line 42 is provided as a mechanism to drain any fluid from the reservoir 24. The drain line 42 extends out through a door 45. A cap or plug 44 placed at the end of the drain line 42 directs fluid through the second supply line 38. Removal of the cap or plug 44 and closing the control valve 46 results in draining of the reservoir 24. The control valve 46 is further utilized to control the amount of the fluid directed from the reservoir 24 into the planting column 16 and horizontal platform 14. A float valve 50 and float 51 can be used to monitor the fluid levels within the reservoir 24. A secondary fluid delivery device, such as a hose 52, is operatively connected to the float valve 50. Opening and closing the float valve 50 allows for introduction or preventing of water into the reservoir 24.

Figure 5B:
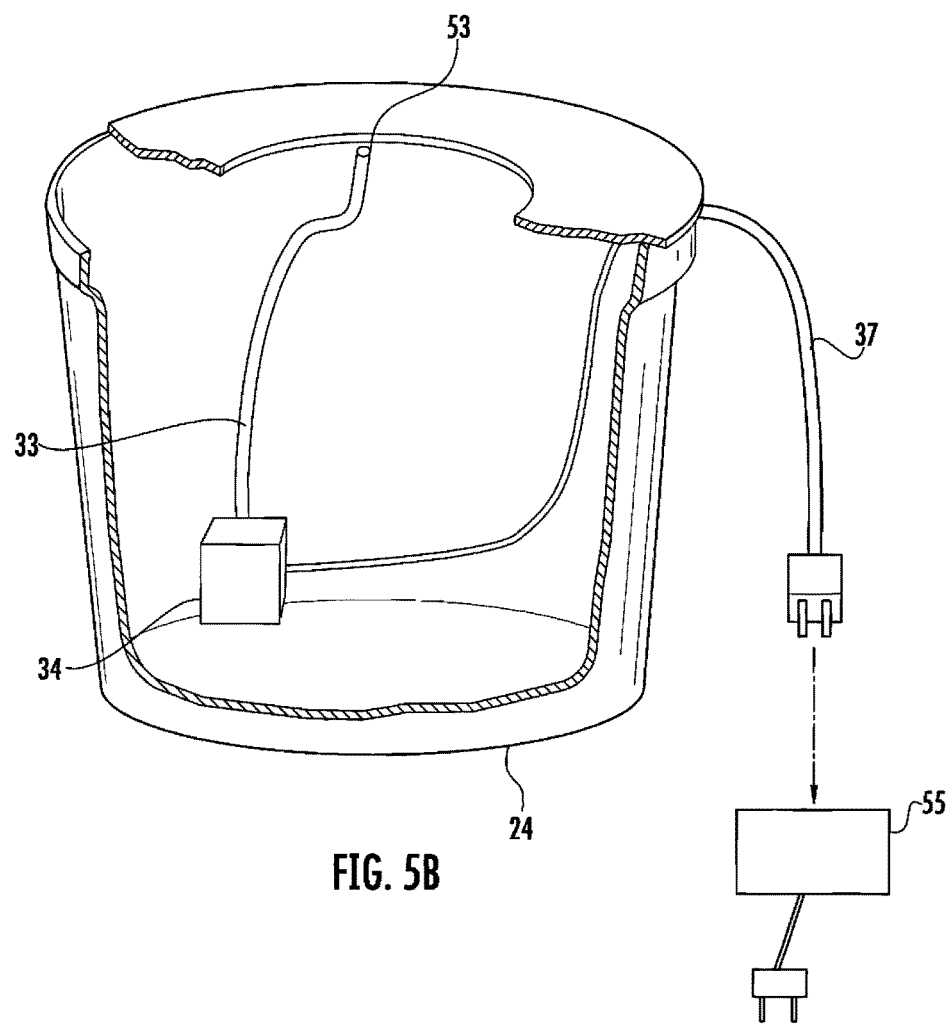
FIG. 5B is an alternative embodiment of the reservoir which can be used in the present invention.

FIG. 5B illustrates an alternative version of the reservoir 24 illustrated in FIG. 5A. In this embodiment, the reservoir 24 simply contains the submersible pump 34. An outlet end 53 of the supply line 33 directs fluid up into the planting column 16. The power supply 37 is shown connected to a timing device 55. In a preferred embodiment, the power supply 37 is associated with a timing mechanism for pumping fluids to the fluid distributor 32 under timing cycles. Two timing mechanisms may be used to provide variable cycles. For example, one timing cycle uses a 15 minute "ON"/15 minute "OFF" cycle. A second timing mechanism can be designed to use a 1 minute "ON"/3 minute "OFF" cycle. The timing device 55, which can also be used with the reservoir 24 described in FIG. 5A, can be a single cycle timing device or a dual cycle timing device.

The planting column 16 can be formed as a single unit. As shown in FIG. 3 or 4, the planting column 16 may be formed from a plurality of modules, 54A-54C, referred to collectively as 54. Forming individual module units allows the user to replace single portions of the planting column 16 without requiring the replacement of the unit as a whole. Each of the modules 54 has side walls 56 and a bottom wall 58 which connect to form an interior space 60. The bottom wall 58 is partially enclosed, having a plurality of drain holes 62. Such arrangement prevents planting medium 63, such as but not limited to stonewood and rockwool, vermiculite, perlite from falling out of module 54 into an adjacent module 54 while allowing for water to pass through to the horizontal platform 12 and back to the reservoir 24. Each module 54 contains an open, top end 64 (see FIG. 3). The bottom wall 58 is preferably contoured to include a circumferential groove 66 adapted to engage a complementary groove 68 in the top end 64. The circumferential groove 66 and the complementary groove 68 allow adjacent modules to stack in an end to end position. A notch 70 may be included to allow for separation of connected, adjacent modules 54.

Each module 54 contains a module conduit 72 integrally carried by bottom wall 58, which forms an opening 74 through the bottom wall. The module conduit 72 extends from the bottom wall 58, up through the interior space 60, to the top end 64. A conduit receiving slot 76 is formed at the bottom wall 58 and is adapted to engage a complementary top portion 78 of the module conduit 72 from an adjacent lower module 54 when stacked end to end. Liquid directed from the reservoir has a travel path through the module conduits 72, towards the fluid distributor 32. The fluid distributor 32 comprises side walls 80, 82 and a bottom wall 84, thereby forming an enclosed interior 86 adapted to hold the liquid 88 pumped from the reservoir 24. A top cover 90 rests on open end 92. Apertures 94 within the bottom wall 84 allow liquid 88 to be distributed to the interior space of the modules 54. Sizing the apertures 94, i.e. smaller diameter than the drain holes 62 of each module 54, provides restricted flow, thereby maintaining a fluid level above the drain holes during watering. The fluid distributor 32 further contains a fluid distributor conduit 96 with fluid conduit receiving slot 97, extending from bottom wall 84 up into the interior 86. The fluid distributor conduit 96 is designed to extend only partially into the interior 86 to allow fluid to flow into the interior, where the fluid can then drain into modules 54. The fluid conduit receiving slot 97 is designed to engage top portions of the conduit 72 when stacked end to end. The bottom wall preferably contains circumferential groove 98 adapted to fit the complementary groove 68 formed in the top of each module 54. As further shown in FIG. 6, inclined cups 67 are formed within each module 54, extending outwardly, and are adapted to support a plant 102. A support opening 104 may be provided to receive and anchor a string to hold an inserted plant if required.

Figure 7:
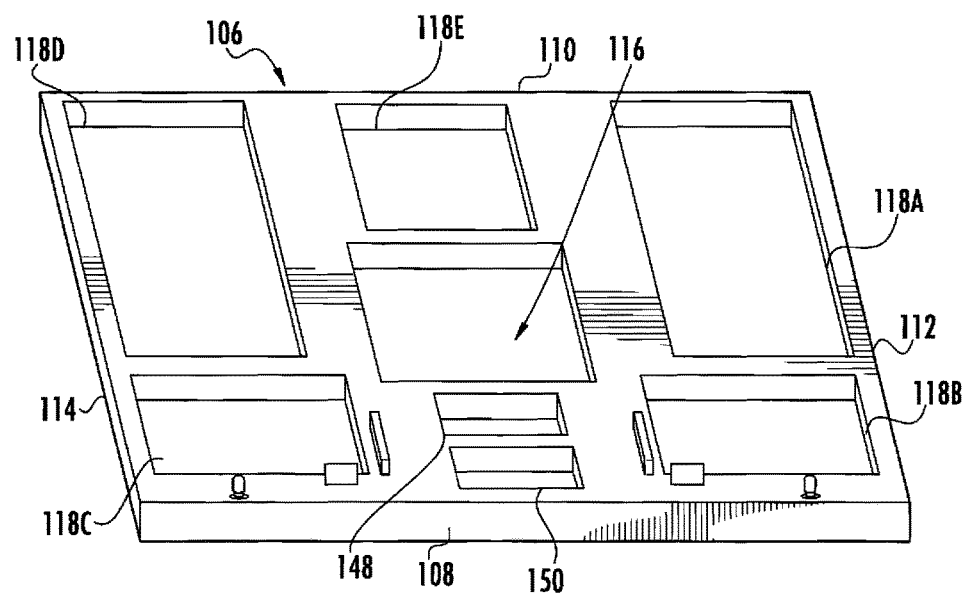
FIG. 7 illustrates an embodiment of a top cover of the horizontal growth platform.
Figure 8:
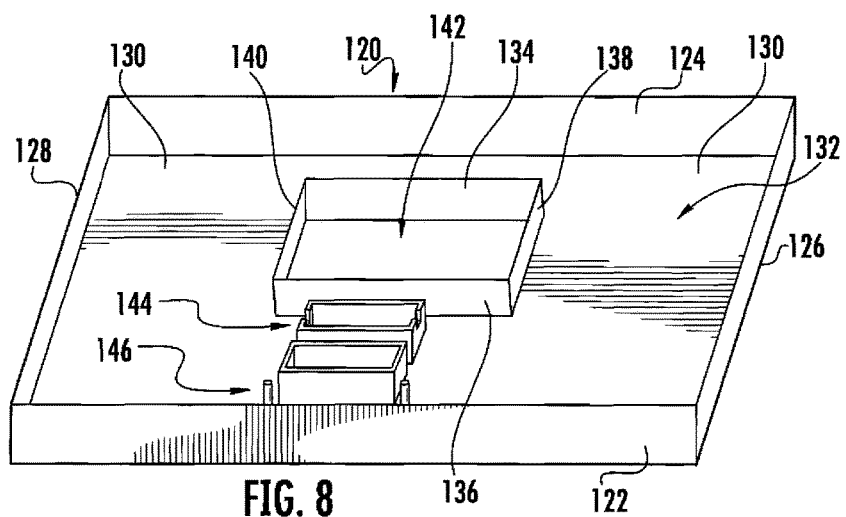
FIG. 8 illustrates an embodiment of the bottom horizontal growth platform reservoir.

As shown in FIGS. 1-3, the hydroponic planting tower with a horizontal growing platform 10 includes a horizontal grow platform 14 fluidly connected to the vertical tower 12 which provides for a device that comprises a horizontal grow section utilizing an ebb and flow water distribution system. The horizontal grow platform 14 can be made as a separate unit to be used independently of a vertical tower 12, or to be attached to a preexisting planting tower to convert a pre-existing vertical tower into a planting tower with a horizontal growing platform. The horizontal grow platform 14, therefore, may provide a basis for a system for growing plants in a soilless growth medium using a horizontal grow platform. Such system may include, for example, a reservoir 24, the horizontal platform 14, and modified module 54C. FIG. 7 illustrates an embodiment of a top portion 106 of the horizontal grow platform 14. The top portion 106 includes side walls 108, 110, 112, and 114. A center cut out 116 allows for coupling with the planting column 16. A plurality of horizontal grow plate openings 118A, 118B, 118C, 118D, and 118E are sized and shaped to receive grow trays and/or grow tray covers. The top portion 106 is designed so side walls 108, 110, 112, and 114 can engage a bottom portion, illustrated herein as a horizontal grow platform reservoir 120, see FIG. 8, thereby providing an enclosed unit. The horizontal grow platform reservoir 120 comprises side walls 122, 124, 126, and 128 surrounding a bottom wall 130 to form a horizontal grow platform interior 132. The bottom wall 130 may be sloped or contain channels (not illustrated) to direct the liquid to a predetermined location. The horizontal grow platform interior 132 provides a reservoir for receiving and holding fluid entering from the reservoir 24 or the vertical tower 12, allowing any plants placed within the horizontal grow platform 14 access to the fluid. Inner walls 134, 136, 138, and 140 frame a center opening 142 which allows for the planting column 16 to fit within the horizontal grow platform 14. The horizontal grow platform interior 132 further contains a fluid return unit 144 configured to provide a mechanism for the fluid within the horizontal grow platform interior 132 to return to the reservoir 24. The horizontal grow platform interior 132 also contains a valve system for controlling the amount of fluid entering and/or exiting, referred to generally as a horizontal grow platform floating valve system 146. The horizontal grow platform floating valve system 146 may be calibrated in that has one or more components configured to control the amount of fluid cycling, or entering in and out of portions of the horizontal grow platform based on the amount of fluid entering in or out, how much or how fast the fluid flows through various components of the valve system, or combinations thereof.

Figure 9:
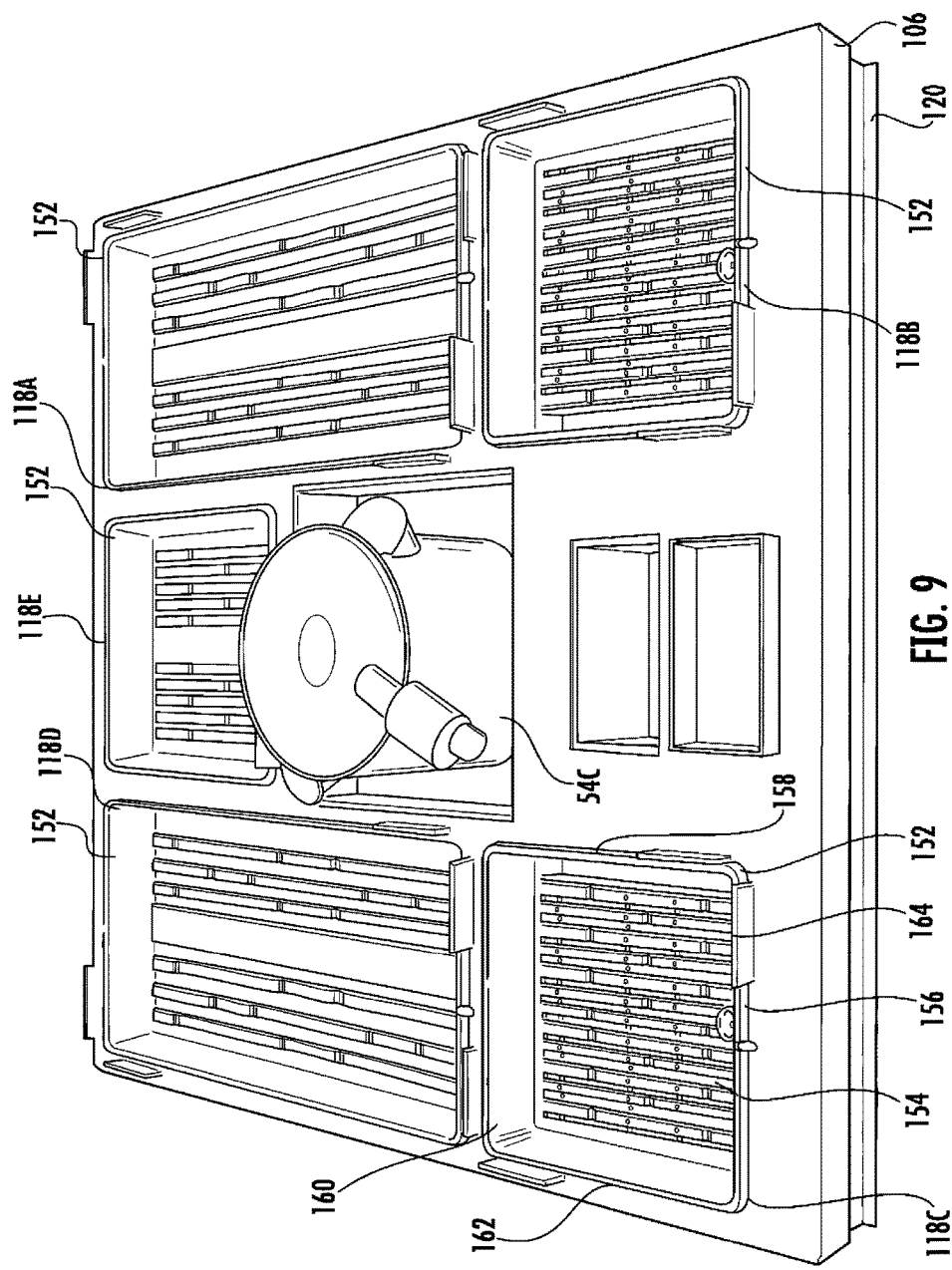
FIG. 9 is an illustrative embodiment of the growth platform with grow containers inserted therein.

When the top portion 106 is placed on the horizontal grow platform reservoir 120, opening 148 within the top portion 106 aligns with the fluid return unit 144, and opening 150 within the top portion 106 aligns with horizontal grow platform floating valve system 146. FIG. 9 illustrates the top portion 106 placed on top of and secured to the horizontal grow platform reservoir 120. Once in position, growth containers 152 can be inserted into openings 118A, 118B, 118C, 118D, and 118E. Each growth container 152 contains a base surface or wall 154 surrounded by side walls 156, 158, 160 and 162 and extending upwardly from the base surface or wall 154. The base surface or wall 154 contains one or more openings or slots 164 sized and shaped to fill and/or drain the liquid within the horizontal platform 14. To aid in the growth of plant material placed within the growth container 152, and prevent seedlings from being washed away, a mesh material 161 (FIG. 10) may be inserted into the growth container 152. An additional container 152 may be inserted within the first container 152 to cover the seeds placed on the mesh. To further aid in growth during the early stages of development, additional growth container 152, placed upside down over existing growth containers 152, see FIG. 11, may be used as well. In this arrangement, the plant or plant seedlings are kept primarily in the dark. At a predetermined time, the growth container 152 orientated in an upside down configuration is removed, exposing the plant to light (as illustrated in FIG. 2). To maintain the growth container 152 in position or avoid shifting, a plurality of guides members, illustrated as vertically positioned plates 153 are arranged about the perimeter of the openings 118A-118D. Hook(s) 155 may also be used to maintain the positioning of the growth container 152.

Figure 12B:
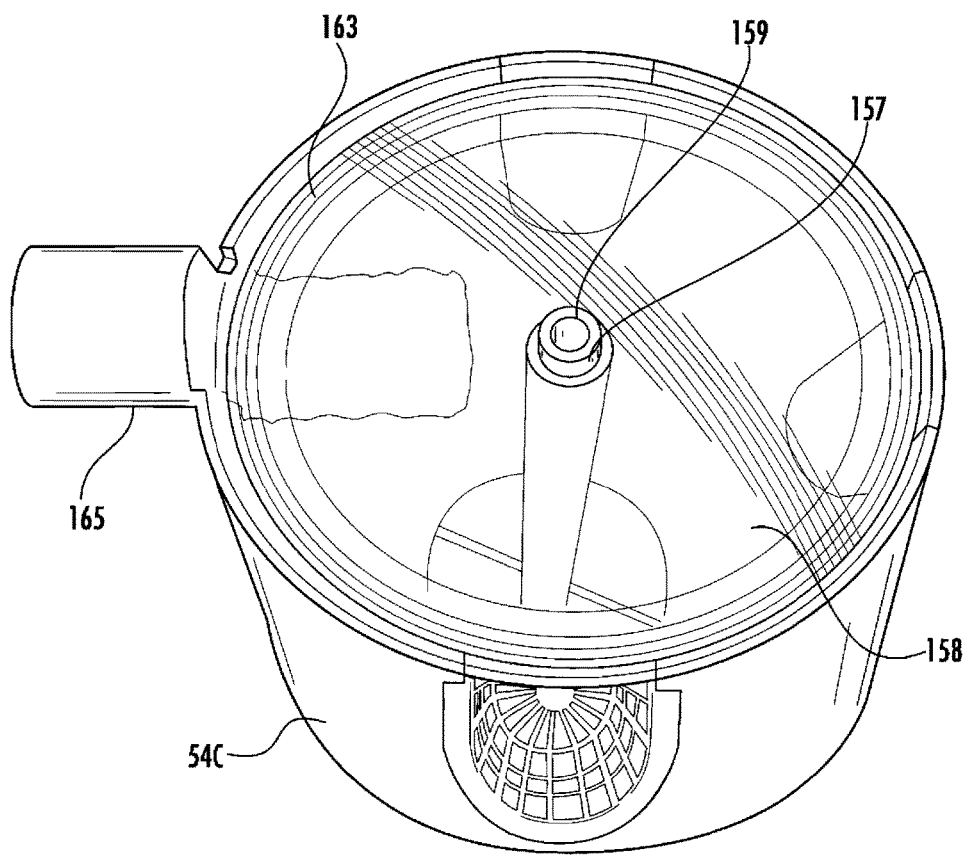
FIG. 12B is a top view of the modified module.
Figure 12C:
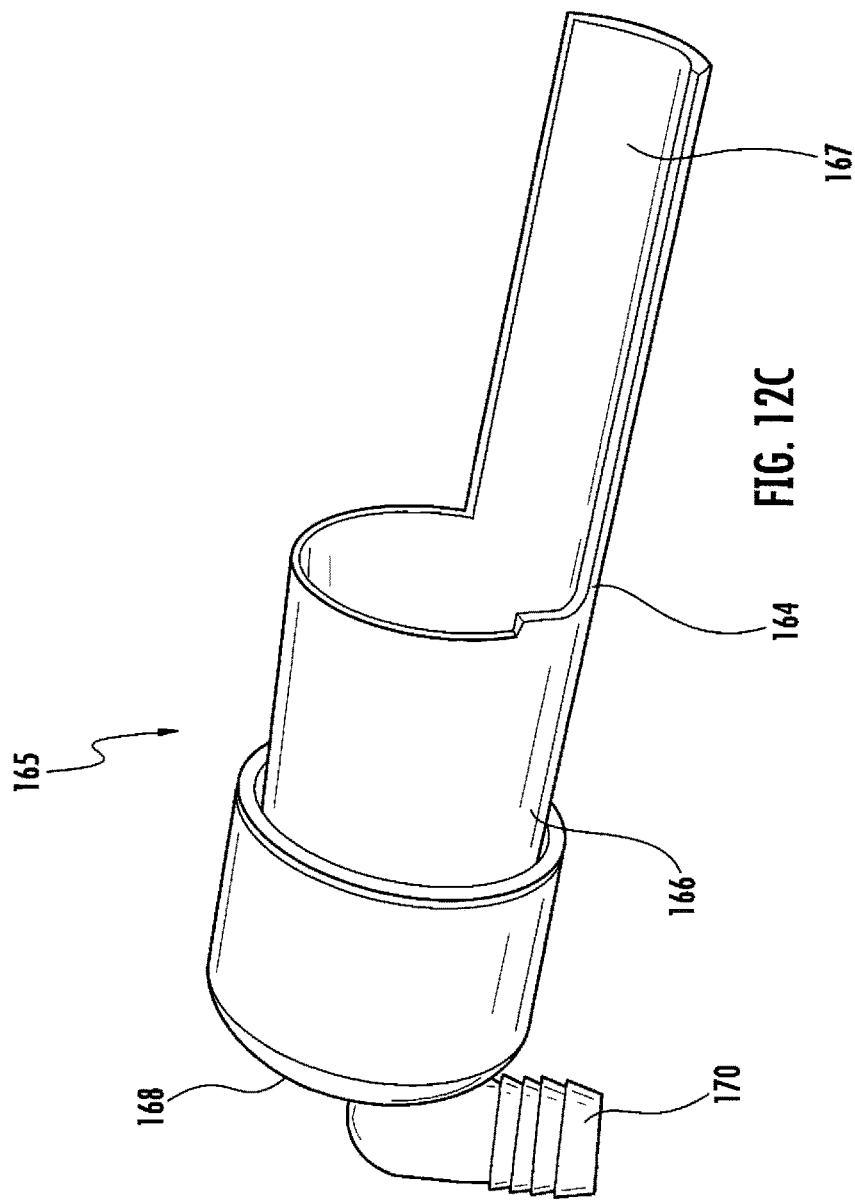
FIG. 12C is an illustrative embodiment of an outlet drain associated with the modified module.

In use, fluid/liquid, such as plant nutrient or water, may be directed from the reservoir 24 up to the fluid distributor 32 through modules 54. Fluid dispensed into the interior regions of the module 54 can be collected and further directed to the horizontal growth platform 14. Module 54C is modified to prevent fluid from draining directly into the reservoir 24 as described in prior art devices and towards the horizontal growth platform 14. Alternatively, fluid from the reservoir 24 may be directed specifically to the modified module 54C, which in turn directs the fluid into the horizontal growth platform 14. Referring to FIGS. 12A-12B, a close-up view of modified module 54C is shown. A cover 158 secures to the open, top end 64, thereby preventing water from entering into the interior area 60, and ultimately back into the reservoir 24. The cover 158 contains a conduit receiving member 157 having an opening 159. The conduit receiving member 157 is sized and shaped to receive a conduit to allow fluids to pass upwardly to the fluid distributor 32 and to engage with a portion of an adjacent module 54 or to the horizontal growth platform 14 directly. The cover 158 may be sloped or contain channel 163 to direct the fluid towards outlet drain 165. The outlet drain 165 contains a first end 164 integrally formed with the cover 158 to direct fluid pooled within the cover 158 to a cylindrical body 166 having a hollow interior to allow fluid to pass therethrough, see also FIG. 12C. The first end 164 includes an elongated recessed body 167 sized and shaped to receive fluid and direct the fluid towards the cylindrical body 166. Opposing the first end and positioned on the opposite side of the cylindrical body 166 is a second end 168. The second end 168 contains a quick connect fitting 170.

Figure 16:
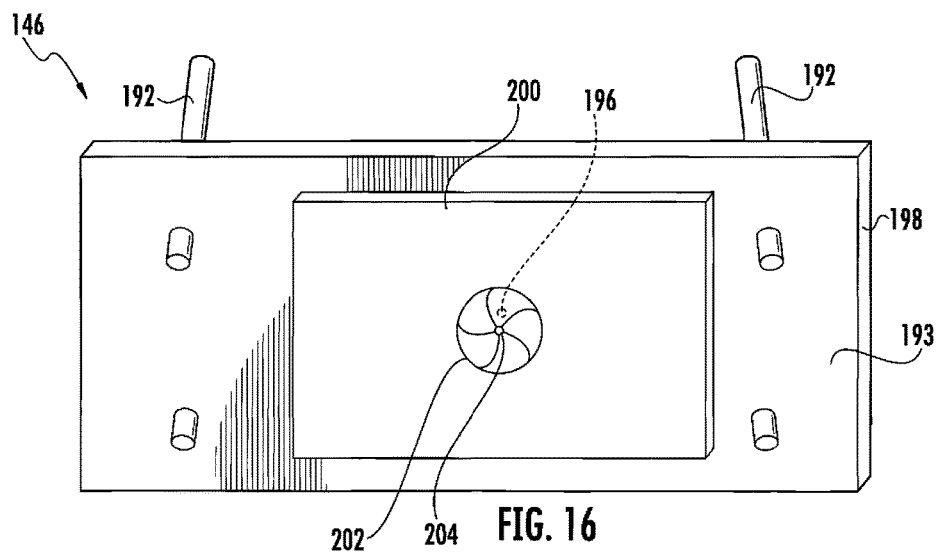
FIG. 16 is a bottom view of the liquid holding basin.
Figure 18B:
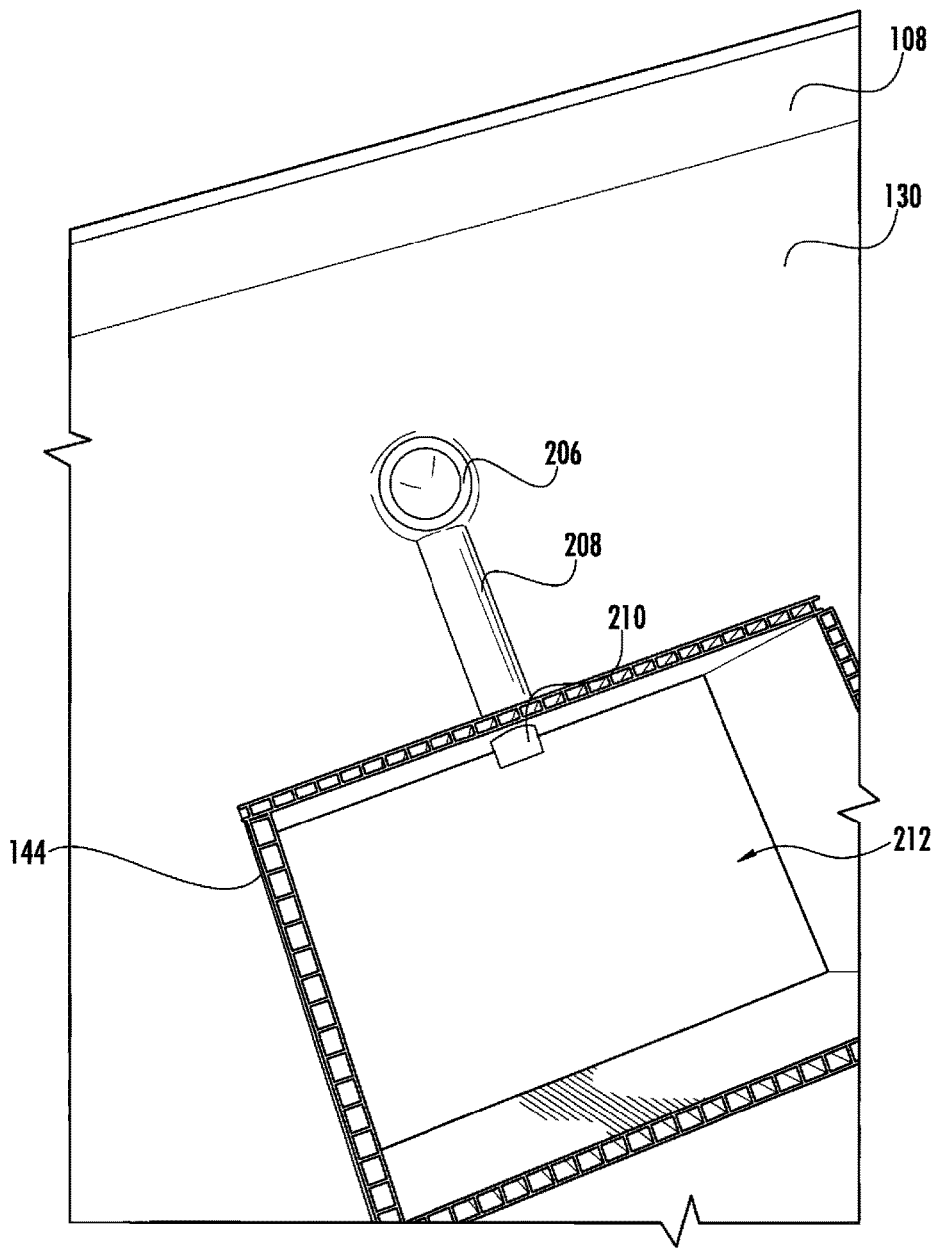
FIG. 18B illustrates a drain member associated with the horizontal grow platform floating valve system.

Fluid leaving the cylindrical body 166 is directed into the horizontal grow platform 14 via a tube 172 (with elbow connector 174), see FIG. 11 or 12A. The tube 172 is shown made of a clear material. Preferably, the tube 172 is made of a dark material that prevents the transmission of light. The tube 172 secures to a quick connect fitting 170 at one end and which is formed within and through a cover 176. The cover 176 is sized and shaped to fit over and cover the horizontal grow platform floating valve system 146. Accordingly, fluid from the fluid reservoir 24 or fluid diverted from the planting column 16 via module 54C travels within the tube 172 and is directed into the horizontal grow platform floating valve system 146. As shown in FIGS. 13-16, the horizontal grow platform floating valve system 146 comprises a fluid holding structure, illustrated herein as a liquid holding basin 178 having an interior 179 for receiving and holding fluid. The liquid holding basin 178 is defined by side walls 180, 182, 184, 186, and bottom wall 188. The liquid holding basin 178 is shown resting on an optional movable body or support structure, illustrated herein as a plate 190. The plate contains a first surface 191 and a second surface 193 (see FIGS. 15 and 16). A plurality of hollow posts 192 are secured to plate 190, and are sized and shaped to receive and linearly move about guide members, illustrated herein as rods 194 (see FIG. 13 and FIG. 18A, with support structure 190 being placed onto rods 194 (see arrows) via hollow posts 192) secured to the bottom wall 130 of the horizontal grow platform reservoir 120. Positioned in the bottom wall 188 of the liquid holding basin 178 is an opening 196. The opening 196 can be sized and shaped to provide a mechanism to control the speed at which liquid stored within the liquid holding basin 178 exits. Referring to FIG. 16, the bottom side 198 of the horizontal grow platform floating valve system 146 is shown. Coupled to the bottom side 198 is a float enabling material, illustrated herein as foam material 200, which allows the liquid holding basin 178 or plate 190 to move about the rods 194. Alternatively, horizontal grow platform floating valve system 146 may be made of a buoyant material such as, but not limited to, closed celled expanded polymer or plastic that can float. Extending from the bottom wall 188 and surrounding the opening 196 is a shaped float member, illustrated herein as a bulb-shaped member 202. The bulb-shaped member 202 contains a calibrated release orifice or aperture 204 sized and shaped to allow liquid to exit. Changing the size or diameter of the aperture 204 changes how fast or slow the liquid can exit. As liquid enters into the liquid holding basin 178, filling the area faster than liquid can escape out of opening 196, the plate 190 moves downwardly towards bottom wall 188 about rods 194. As the liquid holding basin 178 moves downwardly, the bulb-shaped member 202 engages with a shaped float member seat, illustrated herein as a bulb-shaped member receiving area, 206 (FIGS. 18A and 18B). The shaped float member 202 and the shaped float member seat 206 preferably have conjugate shapes or surfaces, so that when the shaped float member sits within the shaped float member seat, movement of any fluid to the fluid return unit 144 is prevented. An o-ring may also be used and placed within the bulbed-shaped member receiving area 206 to provide a tight seal. The bulbed-shaped member receiving area 206 is recessed and has a shape that allows at least a portion of the bulbed-shaped member 202 to rest inside. The bulbed-shaped member receiving area 206 is fluidly connected to the fluid return unit 144 via a hollow tube, or fluid passageway 208 which may be integrally formed into the bottom wall 130 of the horizontal grow platform reservoir 120. The tube 208 extends through a wall of the fluid return unit 144, terminating in opening 210. Entry of the bulbed-shaped member 202 into the bulbed-shaped member receiving area 206 prevents fluid from traveling within the tube 208 and out into the opening 212 and into the reservoir 24. In this position, fluid fills the horizontal grow platform reservoir 120, including the growth container 152 containing, for example, seedlings or growing plants. While the shaped float member 202 and the shaped float member seat 206 are described as bulb-shaped, having a spherical or partially spherical surface, such shapes are illustrative only. Other shapes, such as a polygonal shape or a triangular shape may be used.

Figure 13:
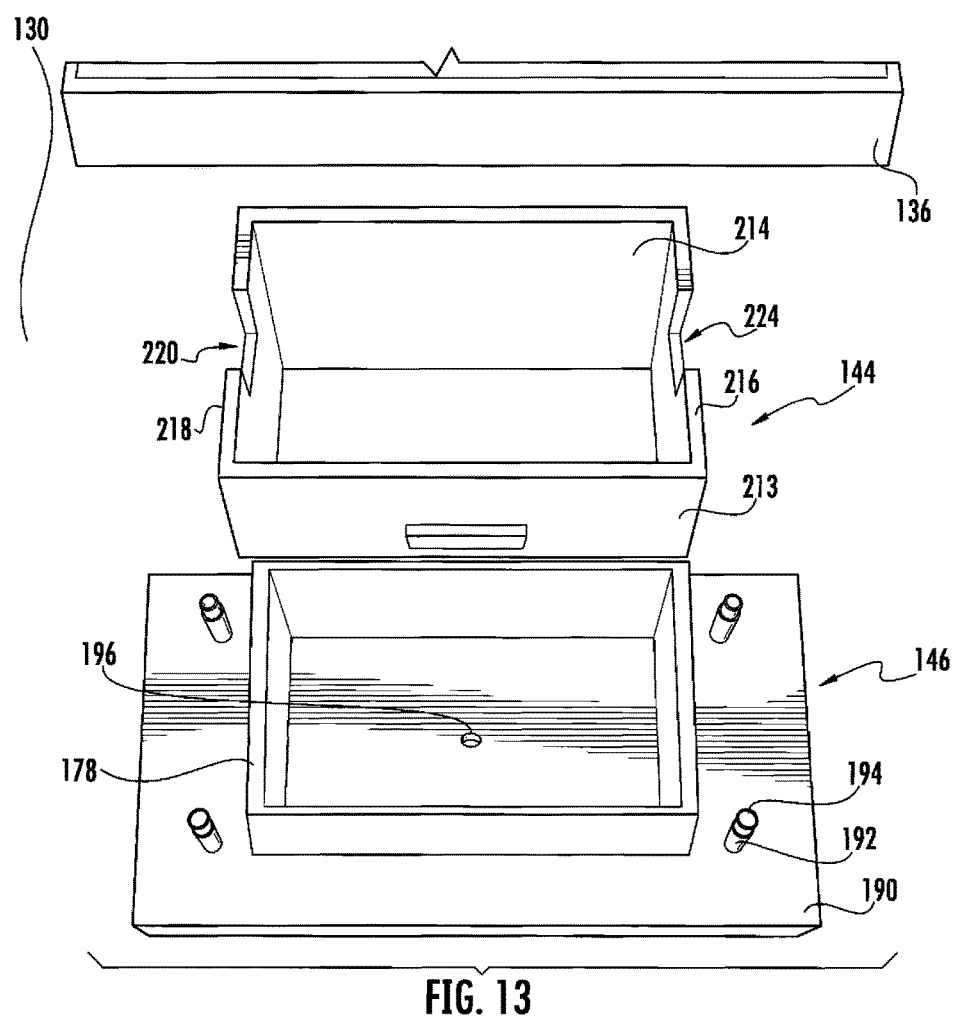
FIG. 13 is a partial view of the horizontal grow platform reservoir illustrating the fluid return unit and the horizontal grow platform floating valve system.
Figure 14:
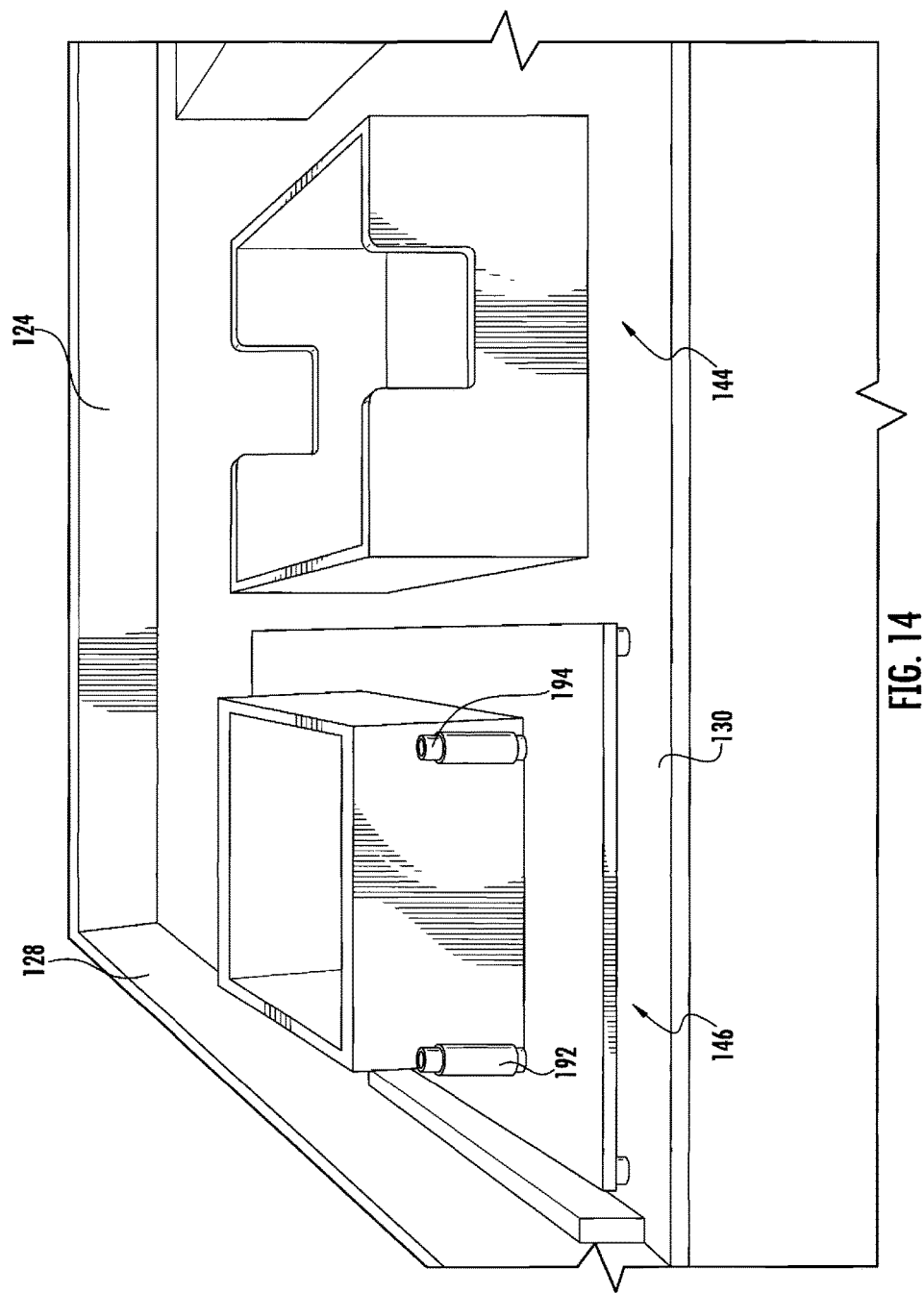
FIG. 14 is a side view of the fluid return unit and the horizontal grow platform floating valve system.
Figure 15:
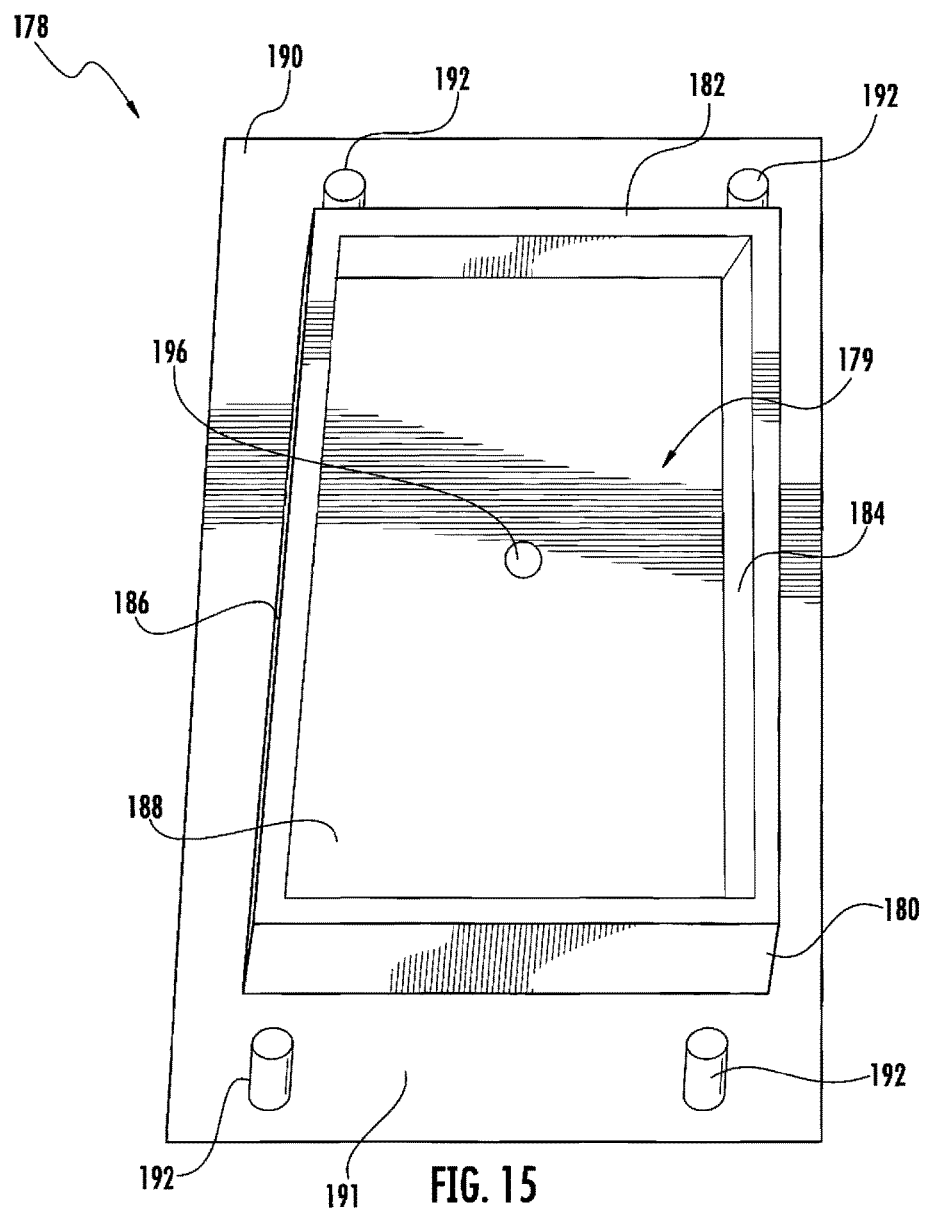
FIG. 15 is a perspective view of an illustrative example of the liquid holding basin.
Figure 17:
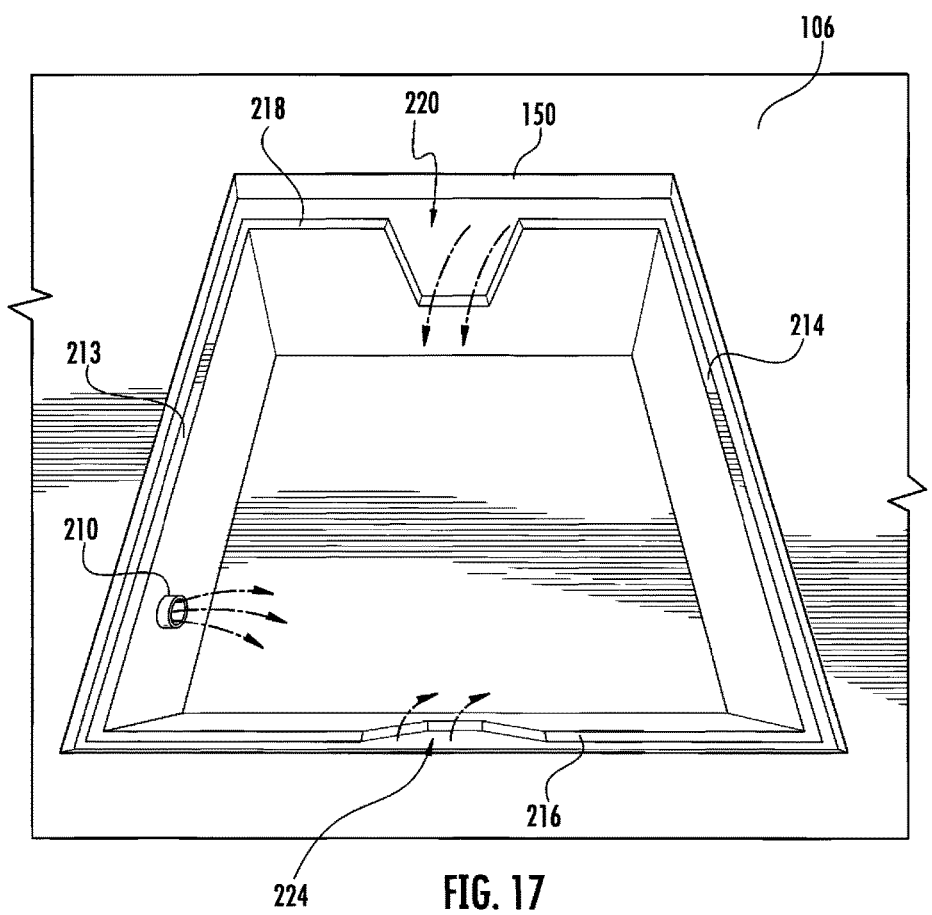
FIG. 17 is a partial view of the top portion of the horizontal grow platform, illustrating the fluid return unit.

As the horizontal grow platform reservoir 120 fills with liquid, the liquid eventually reaches a level and spills over to the reservoir 24 via the fluid return unit 144. FIGS. 13, 14, and 17 illustrate an embodiment of the fluid return unit 144. The return unit contains side walls 213, 214, 216 and 218. Side walls 216 and 218 may contain a cut out region 220 and 224 which allows water to spill over into the opening. Once the liquid drains to a certain level, the bulbed-shaped member 202 disengages from the bulbed-shaped member receiving area 206, allowing additional liquid to flow into the reservoir 24 via tube 208. To prevent outside contaminants from entering into the reservoir 24, the cover 176 encloses opening 150, see FIG. 11. The cover 176 may be held in place by using a securing member, illustrated herein as elastic bands 228.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A system for growing plants in a soilless growth medium using a horizontal grow platform comprising:
    a horizontal grow platform comprising a top portion and a bottom portion configured to receive and store a fluid;
    a floating valve system configured to control the amount of said fluid entering or exiting said horizontal grow platform bottom portion, said floating valve system comprising a buoyant fluid holding basin sized and shaped to receive and hold a predetermined volume of a fluid on one surface and a shaped float member having a calibrated release orifice arranged on a second opposing surface, said fluid holding basin having an opening positioned within a bottom wall and sized and shaped to allow fluid to move between said one surface and said second opposing surface; and a shaped float member seat formed within a bottom surface of said horizontal grow platform bottom portion and sized and shaped to receive said shaped float member; and at least one guide member configured to maintain positioning of said buoyant fluid holding basin within said horizontal grow platform as said buoyant fluid holding basin moves in a liner direction about said at least one guide member;
    a fluid reservoir operatively coupled to said horizontal grow platform;
    a fluid return configured to allow said fluid within an interior portion of said horizontal grow platform to return to said fluid reservoir, said fluid return fluidly coupled to said shaped float member seat via a fluid passageway and configured to allow passage of said fluid from said interior portion of said horizontal grow platform when said shaped float member is not engaged within said shaped float member seat;
    and a pump configured to move said fluid from said fluid reservoir to said horizontal grow platform.

2. The system for growing plants in a soilless growth medium using a horizontal grow platform according to claim 1 wherein said shaped float member seat contains a fluid passageway, said fluid passageway terminating in a fluid return opening.

3. The system for growing plants in a soilless growth medium using a horizontal grow platform according to claim 1 wherein said shaped float member and said shaped float member seat have conjugate shapes.

4. The system for growing plants in a soilless growth medium using a horizontal grow platform according to claim 1 wherein said shaped float member has a spherical or partially spherical shape.

5. The system for growing plants in a soilless growth medium using a horizontal grow platform according to claim 1 further including a timing mechanism.

6. The system for growing plants in a soilless growth medium using a horizontal grow platform according to claim 5 wherein said timing mechanism includes a dual cycle timing device.

7. The system for growing plants in a soilless growth medium using a horizontal grow platform according to claim 6 wherein at least one cycle of said dual cycle timing device is programmed for a 15 minute on period and a 15 minute off period.

8. The system for growing plants in a soilless growth medium using a horizontal grow platform according to claim 6 wherein at least one cycle of said dual cycle timing device is programmed for a 1 minute on period and a 3 minute off period.

9. The system for growing plants in a soilless growth medium using a horizontal grow platform according to claim 1 wherein said top portion contains at least one plant grow container.

10. The system for growing plants in a soilless growth medium using a horizontal grow platform according to claim 9 wherein said at least one plant grow container contains a mesh material.

11. The system for growing plants in a soilless growth medium using a horizontal grow platform according to claim 1 further including two or more vertically stacked growth containers, at least one said vertically stacked growth container fluidly coupled to said horizontal grow platform.

12. The horizontal platform for growing plants in a soilless environment comprising:
    a top portion;
    a bottom portion configured to receive and store a fluid; and
    a floating valve system configured to control the amount of fluid cycling through said horizontal grow platform bottom portion, said floating valve system comprising a buoyant fluid holding structure sized and shaped to receive and hold a predetermined volume of a fluid positioned on a first surface; a shaped float member having a calibrated release orifice arranged on a second opposing surface, said fluid holding structure having an opening positioned within a bottom wall of said fluid holding structure and sized and shaped to allow fluid to travel between said first surface and said second opposing surface; and a shaped float member seat formed within a bottom surface of said bottom portion and sized and shaped to receive said shaped float member, and at least one guide member configured to maintain positioning of said buoyant fluid holding structure within said bottom portion as said buoyant fluid holding structure moves in a liner direction about said at least one guide member;

a fluid reservoir operatively coupled to said horizontal grow platform; and a fluid return configured to allow said fluid within an interior portion of said bottom portion to return to said fluid reservoir, said fluid return fluidly coupled to said shaped float member seat via a fluid passageway and configured to allow passage of said fluid from said bottom portion when said shaped float member is not engaged within said shaped float member seat.

13. The horizontal platform for growing plants in a soilless environment according to claim 12 wherein said shaped float member seat contains a fluid passageway, said fluid passageway terminating in a fluid return opening.

14. The horizontal platform for growing plants in a soilless environment according to claim 12 wherein said shaped float member and said shaped float member seat have conjugate shapes.

15. The horizontal platform for growing plants in a soilless environment according to claim 12 wherein said shaped float member has a spherical or partially spherical surface.

16. The horizontal platform for growing plants in a soilless environment according to claim 12 wherein said floating valve system further includes a plurality of guide members configured to guide movement of said buoyant structure in a vertically linear pattern.

17. A method of planting or growing plants in a soilless environment comprising the steps of:

using a horizontal grow platform comprising a top portion having one or more plant growth containers and a bottom portion having a floating valve system configured to control an amount of fluid entering or exiting said horizontal grow platform bottom portion, said valve system comprising a buoyant structure having a fluid holding structure sized and shaped to receive and hold a predetermined volume of a fluid positioned on a first surface; a shaped float member having a calibrated release orifice arranged on a second opposing surface, said fluid holding structure having an opening positioned within a bottom wall of said fluid holding structure and sized and shaped to allow fluid to travel between said first surface and said second opposing surface; and a shaped float member seat formed within a bottom surface of said horizontal grow platform bottom portion and sized and shaped to receive said shaped float member; at least one guide member configured to maintain positioning of said buoyant fluid holding structure within said bottom portion as said buoyant fluid holding structure moves in a liner direction about said at least one guide member a fluid reservoir operatively coupled to said horizontal grow platform; a fluid return configured to allow said fluid within an interior portion of said bottom portion to return to said fluid reservoir, said fluid return fluidly coupled to said shaped float member seat via a fluid passageway and configured to allow passage of said fluid from said bottom portion when said shaped float member is not engaged within said shaped float member seat; and a pump configured to move said fluid from said fluid reservoir to said horizontal grow platform;

placing one or more plant based seeds within said at least one or more grow containers; and cycling fluid through said horizontal grow platform.

\* \* \* \* \*